United States Patent
Grootaert et al.

(10) Patent No.: US 7,019,083 B2
(45) Date of Patent: Mar. 28, 2006

(54) FLUOROPLASTIC POLYMERS HAVING NITROGEN-CONTAINING CURE SITES

(75) Inventors: Werner M. A. Grootaert, Oakdale, MN (US); Klaus Hintzer, Kastl (DE); Robert E. Kolb, Afton, MN (US); Tilman Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 45 days.

(21) Appl. No.: 10/725,207

(22) Filed: Dec. 1, 2003

(65) Prior Publication Data

US 2004/0122163 A1  Jun. 24, 2004

Related U.S. Application Data

(60) Provisional application No. 60/436,181, filed on Dec. 23, 2002.

(51) Int. Cl.
*C08F 259/08* (2006.01)
*C08F 8/30* (2006.01)

(52) U.S. Cl. .................. 525/276; 525/288; 525/330.5; 525/331.1; 525/331.3

(58) Field of Classification Search ................ 525/276, 525/288, 330.5, 331.1, 331.3
See application file for complete search history.

(56) References Cited

U.S. PATENT DOCUMENTS

| | | | |
|---|---|---|---|
| 4,233,421 A | 11/1980 | Worm | |
| 4,394,489 A | 7/1983 | Aufdermarsh | |
| 4,469,846 A | 9/1984 | Khan et al. | |
| 4,506,035 A | 3/1985 | Barnett et al. | |
| 4,525,539 A | 6/1985 | Feiring | |
| 4,713,418 A | 12/1987 | Logothetis et al. | |
| 4,912,171 A | 3/1990 | Grootaert et al. | |
| 4,952,630 A | 8/1990 | Morgan et al. | |
| 5,057,345 A | 10/1991 | Barrett | |
| 5,262,490 A | 11/1993 | Kolb et al. | |
| 5,285,002 A | 2/1994 | Grootaert | |
| 5,378,782 A | 1/1995 | Grootaert | |
| 5,461,107 A | 10/1995 | Amin et al. | |
| 5,463,021 A | 10/1995 | Beyer et al. | |
| 5,565,512 A | 10/1996 | Saito et al. | |
| 5,621,145 A | 4/1997 | Saito et al. | |
| 5,777,038 A | 7/1998 | Nishikawa et al. | |
| 5,780,552 A | 7/1998 | Kerbow | |
| 6,160,053 A | 12/2000 | Enokida et al. | |
| 6,166,157 A | 12/2000 | Hung et al. | |
| 6,281,296 B1 | 8/2001 | MacLachlan et al. | |
| 6,310,141 B1 | 10/2001 | Chen et al. | |
| 6,310,142 B1 | 10/2001 | Apostolo et al. | |
| 6,395,834 B1 | 5/2002 | Albano et al. | |
| 6,465,576 B1 | 10/2002 | Grootaert et al. | |
| 6,803,425 B1 * | 10/2004 | Hintzer et al. ........... 525/326.2 |
| 6,846,880 B1 * | 1/2005 | Grootaert et al. ........... 525/259 |
| 6,887,927 B1 * | 5/2005 | Grootaert et al. ........... 524/167 |
| 2002/0183457 A1 | 12/2002 | Hintzer et al. | |

FOREIGN PATENT DOCUMENTS

| | | |
|---|---|---|
| EP | 0 424 555 A1 | 5/1991 |
| EP | 0 829 494 A2 | 3/1998 |
| EP | 1 031 606 A1 | 8/2000 |
| EP | 0 829 494 B1 | 7/2003 |
| WO | WO 02/060968 A1 | 8/2002 |

OTHER PUBLICATIONS

U.S. Appl. No. 60/399,245, Grootaert et al., filed Jul. 29, 2002.
U.S. Appl. No. 60/427,768, Grootaert et al., filed Nov. 20, 2002.

* cited by examiner

*Primary Examiner*—James J. Seidleck
*Assistant Examiner*—Olga Asinovsky
(74) *Attorney, Agent, or Firm*—Dean M. Harts

(57) ABSTRACT

Provided is a fluoroplastic or latex comprising a nitrogen-containing cure site and units derived from a fluorinated monomer. Also provided is a curable blend comprising a fluoroplastic and a fluoroleastomer gum, wherein said fluoroplastic comprises a nitrogen-containing cure site and units derived from a fluorinated monomer. Also provided are cured, shaped articles, latex blends, and a process for preparing a fluoroplastic comprising: (a) introducing at least 60 weight percent of a first polymerizable composition comprising a fluorinated monomer into a polymerization reactor; (b) polymerizing said composition in said reactor; (c) introducing at least 70 weight percent of a second polymerizable composition comprising a nitrogen-containing cure site monomer into said reactor following addition of at least 80% by weight of said first polymerizable composition; and (d) copolymerizing said nitrogen-containing cure site monomer with said fluorinated monomer to form a fluoroplastic.

34 Claims, No Drawings

FLUOROPLASTIC POLYMERS HAVING NITROGEN-CONTAINING CURE SITES

CROSS REFERENCE TO RELATED APPLICATION

This application claims priority to U.S. provisional Patent Application No. 60/436,181, filed Dec. 23, 2002.

TECHNICAL FIELD

This invention relates to fluoropolymers.

BACKGROUND

Fluoropolymers are a commercially useful class of materials. Fluoropolymers include, for example, crosslinked fluoroelastomers, uncrosslinked amorphous fluoroelastomer gums, and semi-crystalline plastics. Fluoroelastomers often include cure-sites to facilitate curing in the presence of a catalyst. Crosslinked (cured) fluoroelastomers exhibit significant tolerance to high temperatures and harsh chemical environments. They are particularly well-adapted for use as seals, gaskets, and other molded parts in systems that are exposed to elevated temperatures and/or harsh chemicals. Such parts are widely used in the automotive, chemical processing, semiconductor, aerospace, and petroleum industries, among others.

SUMMARY

In general, the invention features fluoroplastics that include a nitrogen-containing cure site and units derived from at least one fluorinated monomer. The nitrogen-containing cure site, in turn, may be derived from any known method. Examples include the use of a nitrogen-containing cure site monomer, derivatizations of end or pendant reactive groups (e.g., amide or acid functional groups to nitrile groups), the use of nitrogen-containing chain transfer agents, and/or grafting of nitrogen containing moieties. Combinations of the above routes are also within the scope of the invention. The fluoroplastic may further include bromine atoms, iodine atoms, and combinations thereof.

According to one embodiment, the fluoroplastic may be prepared by polymerizing at least 60% by weight of a total polymer mass from a first polymerizable composition that includes the fluorinated monomer in a reactor. Then, a second polymerizable composition is added of which at least 70% by weight includes a nitrogen-containing cure site monomer.

The fluoroplastic may be provided in the form of latex particles. Preferably, the average size of the particles ranges from about 10 to about 500 nm. The particles can have a core-shell structure in which units derived from the fluorinated monomer form the core and the nitrogen-containing cure sites are found in the shell.

The invention further features curable blends in which the fluoroplastic (e.g., in the form of a latex) is combined with an amorphous fluoroelastomer gum (e.g., in the form of a latex), as well as cured, shaped articles prepared from the blends. Unlike typical fluoroplastics, which lack cure sites, fluoroplastics according to the invention can participate in the crosslinking reaction with the amorphous fluoroelastomer gum during cure. The resulting cured blends have improved properties, including reduced compression sets, relative to blends prepared using fluoroplastics lacking cure sites. Uses for the blends include o-rings, gaskets, tubing, and seals in applications related to, for example, the automotive and semiconductor industries.

The details of one or more embodiments of the invention are set forth in the description below. Other features, objects, and advantages of the invention will be apparent from the detailed description and from the claims.

DETAILED DESCRIPTION

The present invention provides a fluoroplastic comprising nitrogen-containing groups, which can participate in a cure reaction. The fluoroplastics include a nitrogen-containing cure site and units derived from at least one fluorinated monomer. The invention also provides a nitrogen-containing fluoroplastic comprising a fluoroelastomer matrix incorporating therein particles of a semicrystalline nitrogen-containing fluoroplastic.

The fluoroplastic can be formed of slightly modified tetrafluoroethylene polymer (below about 5 mole percent (mol %) comonomer) or of tetrafluoroethylene copolymers with one or more monomers (at least about 5 mol % comonomer) containing at least one ethylene unsaturation in amounts varying from 0.001 mol % to 15 mol %, preferably 0.01–10 mol %. The fluoroplastic melting points range from about 100–325° C., preferably about 200–320° C., most preferably 260–320° C.

Examples of useful fluorinated monomers include perfluoroolefins (e.g., tetrafluoroethylene, hexafluoropropylene), perfluorovinyl ethers of the formula $CF_2=CF(OCF_2CF(CF_3))_m(O(CF_2)_n)_pOR_f$, where m=0–2, n=0–6, p=0–6, and $R_f$ is a $C_1$–$C_6$ perfluoroalkyl group. Specific examples include perfluoromethylvinyl ether (PMVE; m=0, n=0, p=1, $R_f=CF_3$), perfluoromethylvinyl ether-31 (MV31; m=0, n=3, p=1, $R_f=CF_3$), perfluoropropylvinyl ether-1 (PPVE-1; m=0, n=2, p=1, $R_f=CF_3$), perfluoropropylvinyl ether-2 (PPVE-2; m=1, n=2, p=1, $R_f=CF_3$), and combinations thereof. Perfluoroalkoxyvinyl ethers may also be included, alone or in combination with other fluorinated monomers.

The fluoroplastics of the invention are modified with nitrogen-containing groups. This can be achieved in several ways. In one embodiment, the cure site is derived from a nitrogen-containing cure site monomer, for example by incorporating a nitrogen-containing comonomer into the polymer backbone.

Useful nitrogen-containing cure site monomers include nitrile-containing fluorinated olefins and nitrile-containing fluorinated vinyl ethers, such as: $CF_2=CFO(CF_2)_LCN$; $CF_2=CFO[CF_2CF(CF_3)O]_q(CF_2O)_yCF(CF_3)CN$; $CF_2=CF[OCF_2CF(CF_3)]_rO(CF_2)_tCN$; and $CF_2=CFO(CF_2)_uOCF(CF_3)CN$, wherein L=2–12; q=0–4; r=1–2; y=0–6; t=1–4; and u=2–6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$.

An effective amount of cure site monomer is used in the fluoroplastic to achieve the desired results. This amount is increased to increase bonding with the fluoroelastomer and this amount is reduced to minimize fluoroplastic modification. The amount of cure site monomer in the fluoroplastic preferably ranges from at least about 0.01 mol %, more preferably at least about 0.1 mol %. The amount of cure site monomer in the fluoroplastic preferably ranges from below about 10 mol %, more preferably below about 5 mol %. Examples include nitrile-containing monomers as well as corresponding amidines, amidine salts, imidates, amides, and ammonium salts.

The fluoroplastics of the invention can be produced by incorporating the comonomers homogenously, or as core-shell materials where at least about 60 mol % of the composition is polymerized before adding substantial amounts of the nitrogen-containing monomer(s).

One useful polymerization method for the fluoroplastic involves an emulsion polymerization in which, initially, at least 60 weight percent (wt %) (preferably at least 70 wt %) of the fluorinated monomer-containing composition is introduced into a polymerization reactor, after which at least 70 wt % (preferably at least 95 wt %) of a nitrogen-containing cure site-containing composition is introduced into the reactor. The cure site material copolymerizes with the fluorinated monomer. The net result is a fluoroplastic that may have a core-shell structure in which the core predominantly contains units derived from the fluorinated monomer and the shell contains the nitrogen-containing cure sites.

The process for preparing a fluoroplastic comprises introducing a first polymerizable composition comprising at least one fluorinated monomer into a polymerization reactor; polymerizing said composition in said reactor to form an at least partially polymerized composition; introducing up to 40 wt (based on the total weight of compositions introduced to the reactor) of a second polymerizable composition into the reactor, said composition comprising at least 70 wt % of nitrogen-containing cure site component; and copolymerizing said nitrogen-containing cure site component with said fluorinated monomer to form a fluoroplastic. In another aspect, up to about 20 wt % (more preferably up to about 10 wt %) of said second polymerizable composition is introduced to the reactor. In addition, the concentration of the nitrogen-containing cure site mateiral in the second polymerizable composition can be increased to at least about 80, 90, 95, or even 98 wt %.

Alternatively, or in combination with the nitrogen group containing comonomers, nitrogen groups can be included in the fluoroplastic by using, for example, nitrogen group containing chain transfer agents (e.g., $I(CF_2)_nCN$ as described in U.S. Pat. No. 6,166,157). Furthermore, nitrogen-containing groups can be included in the fluoroplastic by reacting, for example reactive endgroups (e.g., COF formed during polymerization) with ammonia. The reactive endgroup content is 0.0001–5 mol %, preferably 0.001–2 mol %. The content of the endgroups, such as amide or ammonium carboxylate, can be determined by a known method such as infrared spectroscopy. According to this measurement, the endgroup content should be more than 10 endgroups per million carbon atoms. In one embodiment, the endgroup content is more than about 50 endgroups per million carbon atoms. Additionally the polymerization can be conducted in the presence of cyanide anions (as described in U.S. Ser. No. 60/427,768, filed 20 Nov. 02) including the pseudo halogen analogs such as thiocyanate and cyanate anions.

The fluoroplastics preferably are polymerized by aqueous emulsion polymerization in the presence of non-teleogenic fluorine containing surfactants. The polymer particle size is normally in the range of 100–500 nm after polymerization. The polymerization can be carried out in an aqueous microemulsion by using perfluoropolyoxyalkylene to obtain smaller particles. The average particle size typically is at least about 10 nm, more preferably at least about 50 nm, and even more preferably at least about 60 nm. The average particle size typically is below about 500 nm, more preferably below about 300 nm, and even more preferably below about 250 nm.

The comonomers, especially the nitrogen containing ones, are almost insoluble in water. It is therefore preferred to feed from a preemulsion (as described in U.S. Ser. No. 60/399,245, filed 29 Jul. 02).

The inventive composition of a fluoroplastic and fluoroelastomer is preferably obtained by mixing latices. Alternatively, the composition can be obtained by polymerizing in two steps, which can be carried out in the same reactor. In a first step the semicrystalline fluoroplastic is polymerized (with the desired particle size) and in the second step the fluoroelastomer is polymerized.

A nitrogen-containing cure site also may be introduced in the fluoroplastic by reacting one or more fluorinated monomers with a nitrogen-containing chain transfer agent. This process results in nitrogen-containing end groups.

Bromine atoms, iodine atoms, or combinations thereof may also be introduced into the fluoroplastic, e.g., through reaction during polymerization with a bromine- or iodine-containing chain transfer agent. The bromine and iodine atoms provided additional cure sites on the fluoroplastic.

The fluoroplastic may be combined with a fluoroelastomer gum and a catalyst composition to form a curable blend. The amount of fluoroplastic in the blend typically from about 1 to about 50 weight percent (wt %). The amount of fluoroplastic in the blend preferably is at least about 5 wt %, and in some aspects more preferably at least about 10 wt %. The amount of fluoroplastic in the blend preferably is below about 30 wt %, and more preferably below about 20 wt %. The amount of fluoroplastic in the blend is based upon the total weight of the blend.

The fluoroelastomer gum preferably includes the reaction product of one or more fluorinated monomers and one or more cure site monomers. The cure site monomers facilitate subsequent curing of the composition. Examples of suitable cure site monomers include halogenated monomers, e.g., brominated monomers such as of bromotrifluoroethylene, 3,3,4,4-tetrafluoro-4-bromo-1-butene, bromo-containing perfluorovinyl ethers, nitrile-containing vinyl ethers, imidate-containing vinyl ethers, amidine-containing vinyl ethers, amidine salt-containing vinyl ethers, and combinations thereof. The amount of cure site monomer preferably ranges from 0.1 to 5 mol %, more preferably from 0.3 to 2 mol %. Examples of useful fluorinated monomers include perfluoroolefins (e.g., tetrafluoroethylene), perfluorovinyl ethers (as described above in the case of the fluoroplastic), hydrogen-containing fluorinated monomers (e.g., vinylidene fluoride), and combinations thereof. The fluoroelastomer may further include units derived from non-fluorinated monomers such as ethylene, propylene, and combinations thereof.

Bimodal or multimodal molecular weight fluoroelastomer gums may be used, for example to enhance processability. Such gums may be prepared by latex blending different molecular weight latices, or by broadening the molecular weight distribution during polymerization, e.g., by using different levels of chain transfer agents or different amounts of initiators during the course of the reaction.

Useful curatives include peroxides. These can be used in combination with onium salts. Useful peroxides include dialkyl peroxides, with di-tertiary butyl peroxides being particularly preferred. Specific examples include 2,5-dimethyl-2,5-di(tertiarybutylperoxy)-hexyne-3 and 2,5-dimethyl-2,5-di(tertiarybutylperoxy)-hexane. Additional examples of useful peroxides include dicumyl peroxide, dibenzoyl peroxide, tertiarybutyl perbenzoate, and di[1,3-dimethyl-3-(tertiarybutylperoxy)-butyl]carbonate.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N'N'-tetraallyl terephthalamide; N,N,N',N'-teraallyl malonamide; trivinyl isocyanurate; 2,4,6-trivinyl methyltrisiloxane; and tri(5-norbornene-2-methylene) cyanurate.

Suitable onium salts are described, for example, in U.S. Pat. Nos. 4,233,421; 4,912,171; 5,262,490, and 6,465,576, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

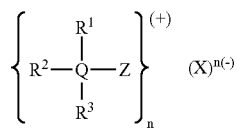

wherein Q is nitrogen or phosphorus; Z is a hydrogen atom or is a substituted or unsubstituted, cyclic or acyclic alkyl group having from 4 to about 20 carbon atoms that is terminated with a group of the formula —COOA where A is a hydrogen atom or is a $NH_4^+$ cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation; $R_1$, $R_2$, and $R_3$ are each, independently, a hydrogen atom or an alkyl, aryl, alkenyl, or any combination thereof; each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above; X is an organic or inorganic anion (e.g., halide, sulfate, acetate, phosphate, phosphonate, hydroxide, alkoxide, phenoxide, or bisphenoxide); and n is a number equal to the valence of the anion X.

Suitable systems for crosslinking the nitrogen-containing cure sites include, for example, organotin compounds (see U.S. Pat. No. 4,394,489), bisaminophenols (see U.S. Pat. No. 4,525,539), ammonium salts (see U.S. Pat. No. 5,565,512), ammonia-generating compounds (see U.S. Pat. No. 6,281,296), and bisamidoximes (see U.S. Pat. No. 5,621,145).

The curable blend can also include fillers to improve the physical properties of both the curable and the cured blend. Examples of suitable fillers include reinforcing agents (e.g., thermal grade carbon blacks or non-black pigments), silica, graphite, clay, talc, diatomaceous earth, barium sulfate, titanium oxide, wollastonite, and combinations thereof. Other ingredients that may be added to the composition, alone or in combination with one or more fillers, include, for example, plasticizers, lubricants, retarding agents, processing aids, pigments, and combinations thereof.

One preferred method of preparing the curable blend involves preparing the fluoroelastomer gum and fluoroplastic in the form of latices, combining the two latices, and then optionally coagulating the resulting combination to form a blend. Latex blending is preferred because it produces a substantially homogeneous blend in which the fluoroelastomer gum and fluoroplastic are intimately and uniformly mixed.

The fluoroelastomer gum and fluoroplastic latices may be prepared prepared using aqueous-based emulsion polymerization techniques. Suitable polymerization initiators for this purpose include permanganate initiators, with potassium permanganate being particularly preferred, and persulfate initiators, with ammonium and potassium persulfates being particularly preferred. Sulfinates may also be used as part of the initiating system, as described in U.S. Pat. Nos. 5,285,002 and 5,378,782). The fluoroplastic latex preferably is cation-exchanged to replace cations with hydrogen ions prior to combining this latex with the fluoroelastomer gum latex.

Once combined, the fluoroelastomer gum and fluoroplastic latices can be coagulated using a high-pressure homogenizer, and high shear coagulation in the presence of dissolved gas can be used as well. High-pressure coagulation techniques are known fluoroplastic processing techniques (e.g., U.S. Pat. No. 5,463,021). In general, high-pressure homogenization involves compressing and decompressing the fluoroelastomer gum/fluoroplastic latex combination through a series of small openings to form a coagulated blend. The coagulated blend is washed and dried. The latices can also be coagulated in more conventional ways such by addition of suitable salt solutions such as magnesium chloride, aluminum sulfate and the like. The methods of salt coagulation are known to those skilled in the art.

The blends can be coagulated by standard methods (e.g., salt addition), however one skilled in the art knows that no fractionation or separation of the materials occurs. Salt free coagulation methods (homogenizer, ultrasonic, freeze coagulation) are preferred, especially when the end use is semiconductor applications.

Before curing, the coagulated and dried curable blend is combined with a curative, preferably by milling the finely divided solids into the gum stock. However, other conventional rubber mixing devices, such as Banbury mixers, also can be used. To avoid premature curing or "scorch," the temperature of the mixture on the mill should not rise above about 120° C.

The molding and curing process typically involves extruding the blend into the desired shape and then autoclaving at temperatures between 125 and 180° C. (more preferably between 150 and 170° C.) for 10–120 minutes (typically 30–60 minutes). Alternatively, articles can be prepared by compression molding the compounded blend in a mold e.g., a cavity or a transfer mold, followed by oven curing. Compression molding of the compounded blend (press cure) is typically conducted at a temperature between about 95° C. and about 230° C., preferably between about 150° C. and about 205° C., for a period of from 5 minutes to about 5 hours, usually from 10 minutes to 60 minutes. A pressure of between about 500 kPa and about 15,000 kPa, preferably between about 4,000 kPa and about 8,000 kPa, is imposed on the compounded mixture in the mold. The molded vulcanizate is then usually post cured (oven cured) at a temperature between about 150° C. and about 260° C., usually at about 232° C., for a period of from about 2 hours to 30 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature. The maximum temperature used is preferably about 260° C. and is held at this value for about 4 hours or more.

The invention will now be described further by way of the following examples.

EXAMPLES

The indicated results were obtained using the following test methods, unless otherwise noted. The test results appear in the table below.

Test Methods

Cure rheology: Tests were run on uncured, compounded samples using a Monsanto Moving Die Rheometer (MDR) Model 2000 in accordance with ASTM D 5289-93a at 370° F. (188° C.), no pre-heat, 12 minutes elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Press-Cure: Sample sheets measuring 150×150×2.0 mm, and O-rings, were prepared for physical property determination by pressing at about 6.9 Mega Pascal (MPa) for 10 minutes at 188° C., unless otherwise noted.

Post-Cure: Press-cured sample sheets and O-rings were exposed to heat in air using the following four stages of conditions: 16 h at 175° C.; 4 h at 200° C.; 4 h at 250° C.; and 8 h at 275° C. The samples were returned to ambient temperature before testing.

Physical Properties: Tensile Strength at Break, Elongation at Break, and Modulus at 100% Elongation were determined using ASTM D 412-92 on samples cut from the press- and post-cured sheet with ASTM Die D. Units are reported MPa.

Hardness: Samples were measured using ASTM D 2240-85 Method A with a Type A-2 Shore Durometer. Units are reported in points on the Shore A scale.

Compression Set: O-ring samples were measured using ASTM 395-89 Method B, 70 h at various temperatures and 25% deflection. The O-rings had a cross-sectional thickness of 0.139 in. (3.5 mm). Results are reported as a percentage of the original deflection.

Materials

Fluoroelastomer A: A fluoropolymer prepared by aqueous emulsion polymerization having interpolymerized units of 65.8 mole percent tetrafluoroethylene (mol % TFE), 33.34 mol % perfluoromethyl vinyl ether (PMVE), and 0.90 mol % of a nitrogen group-containing cure site monomer, $CF_2=CFO(CF_2)_5CN$ (MV5-CN).

Fluoroelastomer B: A fluoropolymer prepared by aqueous emulsion polymerization having interpolymerized units of 65.7 mol % TFE, 33.0 mol % PMVE, and 1.3 mol % of MV5-CN.

Fluoroplastic C: A 40L volume stainless steel reactor equipped with a stirrer working at 220 min$^{-1}$ was filled with 29L deionized water and 150 g ammonium perfluoro octanoate (30% solution). After degassing the system, the reactor was heated to 63° C., and ethane was introduced to reach 0.11 bar, followed by charging 200 g PPVE-1. TFE was introduced to the reactor until a pressure of 13 bar was reached. 1.2 g of the polymerization initiator APS, dissolved in 50 ml water, was introduced to initiate polymerization. The pressure was kept constant by feeding TFE and additional PPVE-1 in a ratio of 1:0.041. Having reached a total amount of 6.3 kg TFE, an emulsion of 116 g MV-5 CN in 116 g APFO solution (30%) was added. The polymerization was continued until a total amount of 6.85 kg TFE was reached. Then the polymerization was stopped, and the reactor was vented and discharged. 33L of a dispersion with a solids content of 18.6% was obtained. The polymer had the following characteristics: average particle size 90 nm; melting point 307° C.; MDR (72° C./5 kg) 1.0; PPVE-1 content 3.9 wt % and MV-5 CN content of 0.8 wt % (by FTIR).

Fluoroplastic D: A fluoropolymer prepared by aqueous emulsion polymerization (as in Fluoroplastic C except that no MV-5 CN was used.

Catalyst Preparation: A 2 L round bottom flask was equipped with magnetic stirring, a temperature probe, and connection to a nitrogen bubbler. The flask was charged with 188 g (0.65 mole) perfluoroadipic acid (made from octafluoroadipoyl fluoride available from SynQuest Laboratories, Inc., Alachua, Fla.) and 488 g of distilled water. While stirring, 898 g (1.3 mole) of a 40 wt % aqueous solution of tetrabutyl ammonium hydroxide (available from Aldrich) was added over 1 h. A slight exothermic reaction was observed. The mixture was stirred for another hour at room temperature (around 23° C.). The flask was heated to 65° C. under a reduced pressure of 15 torr (2 kPa) to remove water to give 523 g (0.65 mole) of $(C_4H_9)_4POOC(CF_2)_4COOP(C_4H_9)_4$ in quantitative yield. The bis-(tetrabutyl phosphonium)-perfluoroadipate had a melting point of 123° C. FNMR confirmed the structure and 2:1 molar ratio.

Catalyst Masterbatch: A mixture of 80 wt % of Fluoroelastomer B was blended using a two-roll mill with 20 wt % of Catalyst.

All other materials were commercially available from Aldrich Chemical Co., Milwaukee, Wis. unless otherwise indicated.

Examples 1 and 2

The latex of Fluoroelastomer A was blended (at 80 wt %) with 20 wt % of Fluoroplastic C. The latex blend was then coagulated, washed, and dried. 94 phr of this blend was compounded with 4 phr $TiO_2$ (available as Titone A/110 from Sakai Chemicals, Osaka, Japan), 1.5 phr fumed silica (available as Aerosil R 972 from Degussa), and 7.5 phr Catalyst Masterbatch. Example 2 was prepared as in Example 1 except Fluoroelastomer B was used. Samples were prepared and tested as in CE-1-2. The results are included in the tables below.

Comparative Examples 1 and 2 (CE-1 and CE-2)

The latex of Fluoroelastomer A was blended (at 80 wt %) with 20 wt % of Fluoroplastic D. The latex blend was then coagulated, washed, and dried. 94 phr of this blend was compounded with 4 phr $TiO_2$ (available as Titone A/110 from Sakai Chemicals, Osaka, Japan), 1.5 phr fumed silica (available as Aerosil R 972 from Degussa), and 7.5 phr Catalyst Masterbatch. CE-2 was prepared as in CE-1 except Fluoroelastomer B was used.

Cure rheology tests were run on the uncured, compounded sample. The results are included in the table. A sheet of the compounded admixture was press cured, tested, and subsequently post-cured. The post-cured samples were tested for compression set at various temperatures and change in properties on heat aging. The test results are included in the table.

TABLE 1

Test Results

| Example | 1 | CE-1 | 2 | CE-2 |
|---|---|---|---|---|
| Cure Rheology | | | | |
| $M_L$ (N-m) | 0.21 | 0.20 | 0.17 | 0.15 |
| $M_H$ (N-m) | 1.64 | 1.52 | 1.61 | 1.55 |
| $M_H - M_L$ (N-m) | 1.43 | 1.32 | 1.44 | 1.40 |
| $t_s2$ (min) | 4.03 | 3.94 | 1.63 | 1.76 |
| t'50 (min) | 6.28 | 5.88 | 2.58 | 2.74 |
| t'90 (min) | 12.74 | 11.53 | 5.60 | 6.40 |
| Original Physical Properties | | | | |
| Tensile strength (MPa) | 14.23 | 13.10 | 11.72 | 11.38 |
| Elongation at break (%) | 310 | 345 | 240 | 240 |
| 100% modulus (MPa) | 4.17 | 3.98 | 4.38 | 4.27 |
| Hardness (Shore A) | 79 | 77 | 78 | 77 |
| Heat Aged 70 h @ 290° C. per ASTM D573 | | | | |
| Tensile strength (MPa) | 16.25 | 16.18 | | |
| Elongation at break (%) | 380 | 415 | | |
| 100% modulus (MPa) | | | | |
| Hardness (Shore A) | 76 | 74 | | |
| Compression Set | | | | |
| 70 h, 315° C. | 54.1 | 67.8 | 56 | 64 |
| 70 h, 325° C. | n/a | n/a | 40 | 46 |

The results in Table 1 demonstrate that incorporating a nitrogen-containing cure site into a fluoroplastic results in fluoroplastic/fluoroelastomer blends having improved properties. In particular, the cured blends exhibit improved compression set values relative to blends in which the fluoroplastic lacks the nitrogen-containing cure site.

A number of embodiments of the invention have been described. Nevertheless, it will be understood that various modifications may be made without departing from the spirit and scope of the invention. Accordingly, other embodiments are within the scope of the following claims. All publications and patents cited herein are incorporated by reference to the same extent as if each individual publication or patent was specifically and individually indicated to be incorporated by reference.

What is claimed is:

1. A fluoroplastic comprising a nitrogen-containing cure site and units derived from a fluorinated monomer, wherein the cure site is selected from an amidine group, a salt thereof, and combinations thereof.

2. A fluoroplastic according to claim 1 wherein said nitrogen-containing cure site is derived from a nitrogen-containing cure site monomer.

3. A fluoroplastic according to claim 1 wherein said fluorinated monomer is selected from the group consisting of perfluoroolefins, perfluorovinyl ethers, and combinations thereof.

4. A fluoroplastic according to claim 3 wherein said perfluoroolefin comprises tetrafluoroethylene.

5. A fluoroplastic according to claim 3 wherein said perfluorovinyl ether is selected from the group consisting of perfluoroalkylvinyl ethers, perfluoroalkoxyvinyl ethers, and combinations thereof.

6. A fluoroplastic according to claim 1 comprising units derived from (a) a nitrogen-containing cure site monomer, (b) tetrafluoroethylene, and (c) a perfluoroalkylvinyl ether.

7. A fluoroplastic according to claim 1 wherein said nitrogen-containing cure site is derived from a nitrogen-containing chain transfer agent.

8. A fluoroplastic according to claim 1 wherein said fluoroplastic further comprises bromine atoms, iodine atoms, and combinations thereof.

9. A fluoroplastic according to claim 1 wherein said fluoroplastic is in the form of a core-shell polymer in which the core comprises units derived from the fluorinated monomer and the shell comprises the nitrogen-containing cure site.

10. A latex comprising fluoroplastic particles that include a nitrogen-containing cure site and units derived from a fluorinated monomer, wherein the cure site is selected from an amidine group, a salt thereof, and combinations thereof.

11. A latex according to claim 10 wherein said particles have a particle size ranging from about 10 to about 500 nm.

12. A curable blend comprising: (a) a fluoroplastic and (b) a fluoroelastomer gum, said fluoroplastic comprising a nitrogen-containing cure site and units derived from a fluorinated monomer.

13. A curable blend according to claim 12 wherein said nitrogen-containing cure site is derived from a nitrogen-containing cure site monomer.

14. A curable blend according to claim 13 wherein said nitrogen-containing cure site monomer is selected from the group consisting of nitrile-containing cure site monomers, amidine-containing cure site monomers and salts thereof, imidate-containing cure site monomers, and combinations thereof.

15. A curable blend according to claim 14 wherein said nitrogen-containing cure site monomer comprises a nitrile-containin cure site monomer.

16. A curable blend according to claim 12 wherein said fluorinated monomer is selected from the group consisting of perfluoroolefins, perfluorovinyl ethers, and combinations thereof.

17. A curable blend according to claim 12 wherein said nitrogen-containing cure site is derived from a nitrogen-containing chain transfer agent.

18. A curable blend according to claim 12 wherein said fluoroplastic further comprises bromine atoms, iodine atoms, and combinations thereof.

19. A curable blend according to claim 12 wherein said fluoroplastic is in the form of a core-shell polymer in which the core comprises units derived from the fluorinated monomer and the shell comprises the nitrogen-containing cure site.

20. A curable blend according to claim 12 comprising from about 1–70% by weight of said fluoroplastic.

21. A cured, shaped article comprising: (a) a fluoroplastic and (b) a fluoroleastomer, said fluoroplastic comprising a nitrogen-containing cure site and units derived from a fluorinated monomer.

22. A cured, shaped article according to claim 21 wherein said article has a compression set no greater than about 70% after 70 hours at 315° C.

23. A cured, shaped article according to claim 21 wherein said nitrogen-containing cure site is derived from a nitrogen-containing cure site monomer.

24. A cured, shaped article according to claim 23 wherein said nitrogen-containing cure site monomer is selected from the group consisting of nitrile-containing cure site monomers, amidine-containing cure site monomers and salts thereof, imidate-containing cure site monomers, and combinations thereof.

25. A cured, shaped article according to claim 24 wherein said nitrogen-containing cure site monomer comprises a nitrile-containing cure site monomer.

26. A cured, shaped article according to claim 21 wherein said fluorinated monomer is selected from the group consisting of perfluoroolefins, perfluorovinyl ethers, and combinations thereof.

27. A cured, shaped article according to claim 21 wherein said nitrogen-containing cure site is derived from a nitrogen-containing chain transfer agent.

28. A cured, shaped article according to claim 21 wherein said fluoroplastic further comprises bromine atoms, iodine atoms, and combinations thereof.

29. A cured, shaped article according to claim 21 wherein said fluoroplastic is in the form of a core-shell polymer in which the core comprises units derived from the fluorinated monomer and the shell comprises the nitrogen-containing cure site.

30. A blend comprising (a) a latex comprising fluoroplastic particles and (b) a latex comprising fluoroelastomer gum particles, said fluoroplastic particles comprising a nitrogen-containing cure site and units derived from a fluorinated monomer.

31. A blend according to claim 30 wherein said fluoroplastic particles have a particle size ranging from about 10 to about 500 nm.

32. A process for preparing a fluoroplastic comprising: (a) introducing a first polymerizable composition comprising at least one fluorinated monomer into a polymerization reactor; (b) polymerizing said composition in said reactor to form an at least partially polymerized composition; (c) introducing up to 40 weight percent (based on the total weight of compositions introduced to the reactor) of a second polymerizable composition into the reactor, said composition comprising at least 70 weight percent of nitrogen-containing cure site component; and (d) copolymerizing said nitrogen-containing cure site component with said fluorinated monomer to form a fluoroplastic.

33. A process according to claim 32 comprising introducing up to about 20 weight percent of said second polymerizable composition.

34. A process according to claim 32 comprising introducing up to about 10 weight percent of said second polymerizable composition.

* * * * *

UNITED STATES PATENT AND TRADEMARK OFFICE
CERTIFICATE OF CORRECTION

PATENT NO.         : 7,019,083 B2
APPLICATION NO.    : 10/725207
DATED              : March 28, 2006
INVENTOR(S)        : Werner M. A. Grootaert Page 1 of 1

It is certified that error appears in the above-identified patent and that said Letters Patent is hereby corrected as shown below:

<u>On the Title Page, Item (57) (Abstract)</u>
Line 4, delete "fluoroleastomer" and insert -- fluoroelastomer --, therefor.

<u>Column 3</u>
Line 33, delete "mateiral" and insert -- material --, therefor.

<u>Column 6</u>
Line 15, delete "prepared" before "using".

<u>Column 8</u>
Line 29, delete "ammonium" and insert -- phosphonium --, therefor.

<u>Column 10</u>
Line 40, in Claim 15, delete "containin" and insert -- containing --, therefor.
Line 59, in Claim 21, delete "fluoroleastomer" and insert
    -- fluoroelastomer --, therefor.

Signed and Sealed this

Tenth Day of February, 2009

JOHN DOLL
*Acting Director of the United States Patent and Trademark Office*